(12) United States Patent
Song

(10) Patent No.: US 12,215,929 B2
(45) Date of Patent: Feb. 4, 2025

(54) DEVICE FOR RECOVERING WASTE HEAT FROM HOT WATER

(71) Applicant: IDO CO., LTD, Asan-si (KR)

(72) Inventor: Young il Song, Asan-si (KR)

(73) Assignee: IDO CO., LTD, Asan-si (KR)

( * ) Notice: Subject to any disclaimer, the term of this patent is extended or adjusted under 35 U.S.C. 154(b) by 180 days.

(21) Appl. No.: 18/016,735

(22) PCT Filed: Jul. 5, 2021

(86) PCT No.: PCT/KR2021/008518
§ 371 (c)(1),
(2) Date: Jan. 18, 2023

(87) PCT Pub. No.: WO2022/019524
PCT Pub. Date: Jan. 27, 2022

(65) Prior Publication Data
US 2023/0280105 A1    Sep. 7, 2023

(30) Foreign Application Priority Data

Jul. 24, 2020 (KR) .......................... 10-2020-0092133

(51) Int. Cl.
*F24H 3/00* (2022.01)
*F28D 7/10* (2006.01)
*F28D 21/00* (2006.01)

(52) U.S. Cl.
CPC ............ *F28D 21/0012* (2013.01); *F28D 7/10* (2013.01)

(58) Field of Classification Search
CPC .............................. F28D 21/0012; F28D 7/10
USPC .......................................................... 165/47
See application file for complete search history.

(56) References Cited

FOREIGN PATENT DOCUMENTS

| CN | 1844825 A | * | 10/2006 |
| CN | 1854667 A | * | 11/2006 |
| JP | 09-60826 A | | 3/1997 |
| JP | 2014-062724 A | | 4/2014 |
| KR | 2000-0034779 A | | 6/2000 |
| KR | 10-1176927 B1 | | 8/2012 |
| KR | 10-1919340 B1 | | 11/2018 |
| KR | 10-2207412 B1 | | 1/2021 |

* cited by examiner

*Primary Examiner* — Davis D Hwu
(74) *Attorney, Agent, or Firm* — NKL LAW; Jae Youn Kim

(57) ABSTRACT

Disclosed is a device for recovering waste heat from hot water. The waste water heat recovery device includes heat exchange units each having a waste water pipe part along which waste water as the hot water flows and a raw water pipe part along which raw water as cold water flows, while being located inside the waste water pipe part, and a rotation driving part for rotating the raw water pipe parts. Each raw water pipe part includes a rotary shaft, a spiral blade attached to the outer peripheral surface of the rotary shaft, and a raw water pipe spirally wound on the outer peripheral surface of the rotary shaft to flow the raw water therealong, while being disposed along the space formed by the spiral blade on the outer peripheral surface of the rotary shaft. While the raw water pipe is rotating, foreign matter flowing along the waste water pipe part is discharged by means of the spiral blade, and the raw water pipe is disposed below top of the spiral blade to thus have no contact with the inner peripheral wall of the waste water pipe part.

4 Claims, 3 Drawing Sheets

DEVICE FOR RECOVERING WASTE HEAT FROM HOT WATER

TECHNICAL FIELD

The present invention relates to a device for recovering waste heat from hot water, and more specifically, to a device for recovering waste heat from hot water that is capable of effectively recovering the waste heat from the hot water thrown out after use.

BACKGROUND ART

Heat exchange technology is used in various fields. For example, heat is recovered from the water used in cooling and heating processes of a building or the hot water discharged from a dish washer and thus recycled. As dish washers are widely used in large-sized restaurants or schools providing meals for students, a large amount of hot water is used and just thrown out after use, which causes high energy consumption.

Various devices for waste water heat recovery have been suggested, but existing heat exchange configurations fail to efficiently perform the waste water heat recovery. In specific, various types of foreign matter are contained in the waste water thrown out from the dish washer, thereby making it hard to perform the heat recovery from the waste water containing the foreign matter. For example, a lot of foreign matter exists in the waste water of the dish washer after dishes have been washed, thereby making it difficult to build the heat exchange configuration. When pipes come into contact with each other to perform heat exchange, they may be clogged owing to the flow of foreign matter.

To solve such problems, a waste water heat recovery device is disclosed in Korean Patent No. 10-1919340 as filed by the same applicant as the present invention. According to the conventional waste water heat recovery device, a coil-shaped raw water pipe part is disposed inside a waste water pipe part, and as it rotates, the foreign matter existing in the waste water pipe part is discharged gently, while heat exchange is being performed with a relatively large contact area between the pipes.

In the case of the conventional waste water heat recovery device, the coil-shaped raw water pipe part rotates inside the waste water pipe part so that the foreign matter existing in the waste water pipe part is discharged well. However, as the raw water pipe part rotates inside the waste water pipe part, it may come into contact with the inner peripheral wall of the waste water pipe part, thereby making it possible to cause the abrasion damage thereof. In this case, the raw water pipe part has to have a relatively low thickness to perform efficient heat exchange, which causes the abrasion damage thereof to become serious.

DISCLOSURE OF THE INVENTION

Technical Problem

Accordingly, it is an object of the present invention to provide a device for recovering waste heat from hot water that is capable of allowing a raw water pipe part to rotate inside a waste water pipe part, while suppressing the raw water pipe part from coming into direct contact with the waste water pipe part, thereby enhancing a heat exchange efficiency and preventing abrasion damage from occurring.

Technical Solution

To accomplish the above-mentioned objects, according to the present invention, a device for recovering waste heat from hot water may include: N heat exchange units (wherein N is greater than or equal to 1) connected in series to each other by means of a coupling member, each heat exchange unit having a waste water pipe part along which waste water as the hot water flows and a raw water pipe part along which raw water as cold water flows, while being located inside the waste water pipe part; and a rotation driving part for rotating the raw water pipe parts, wherein each raw water pipe part may include a rotary shaft, a spiral blade attached to the outer peripheral surface of the rotary shaft, and a raw water pipe spirally wound on the outer peripheral surface of the rotary shaft to flow the raw water therealong, while being disposed along the space formed by the spiral blade on the outer peripheral surface of the rotary shaft.

The raw water pipe may be disposed below top of the spiral blade in a height direction of the spiral blade from the outer peripheral surface of the rotary shaft, so that while rotating, the raw water pipe has no contact with the inner peripheral wall of the waste water pipe part.

The rotary shaft may include pipe portions located on both ends thereof and a closed rod portion located between the pipe portions.

Both ends of the raw water pipe may be connected to the pipe portions of the rotary shaft, while allowing the raw water to communicate therebetween.

Advantageous Effects

According to the present invention, the waste water heat recovery device having excellent efficiency is provided. The spiral raw water pipe parts along which the cold water flows are located inside the waste water pipe parts along which the hot water flows, thereby allowing the contact areas for heat exchange to extend. Further, as the raw water pipe parts rotate to effectively discharge the foreign matter existing in the waste water pipe parts, heat of the waste water discharged from the dish washer is recycled. In specific, the spiral blades are attached to the rotary shafts of the raw water pipe parts, and the spiral raw water pipes are located along the spaces formed by the spiral blades on the outer peripheral surfaces of the rotary shafts, so that the raw water pipes are prevented from coming into contact with the inner peripheral walls of the waste water pipe parts, thereby avoiding their abrasions damage. As a result, the raw water pipes can have low thicknesses to the maximum, thereby optimizing their heat exchange efficiency.

MODE FOR INVENTION

Hereinafter, an embodiment of the present invention will be described in detail with reference to the accompanying drawings. In the description, if it is determined that the detailed explanation on the well known technology related to the present invention makes the scope of the present invention not clear, the explanation will be avoided for the brevity of the description.

Desirably, a waste water heat recovery device according to the present invention may be used more appropriately in the case where foreign matter is contained in the waste water as hot water. For example, the waste water heat recovery device according to the present invention is desirably connected to a dish washer using a large amount of hot water and thus utilizes the waste water discharged from the dish washer. The dish washer makes use of hot water to enhance its washing efficiency, and in this case, the used hot water is thrown out. The waste water heat recovery device according to the present invention includes heat exchange units each having the shape of a double pipe. In specific, a raw water pipe part along which the cold water flows is located inside a waste water pipe part along which the hot water flows, and the raw water pipe part is spirally (coiledly) disposed so that while rotating inside the waste water pipe part, it serves to discharge the foreign matter existing in the waste water pipe part. Further, the waste water heat recovery device according to the present invention is configured to allow the plurality of heat exchange units to be arranged side by side so that the heat exchange efficiency can be maximized and the device can be compact in size. Each heat exchange unit includes the waste water pipe part and the raw water pipe part. In specific, the waste water heat recovery device according to the present invention is configured to allow the spiral raw water pipe part to be located along the space formed by the spiral blade on the outer peripheral surface thereof, thereby preventing the raw water pipe part from coming into contact with the inner peripheral wall of the waste water pipe part. Accordingly, the raw water pipe part may have a relatively low thickness or be made of a soft material having high thermal conductivity, such as copper.

Figure 1:
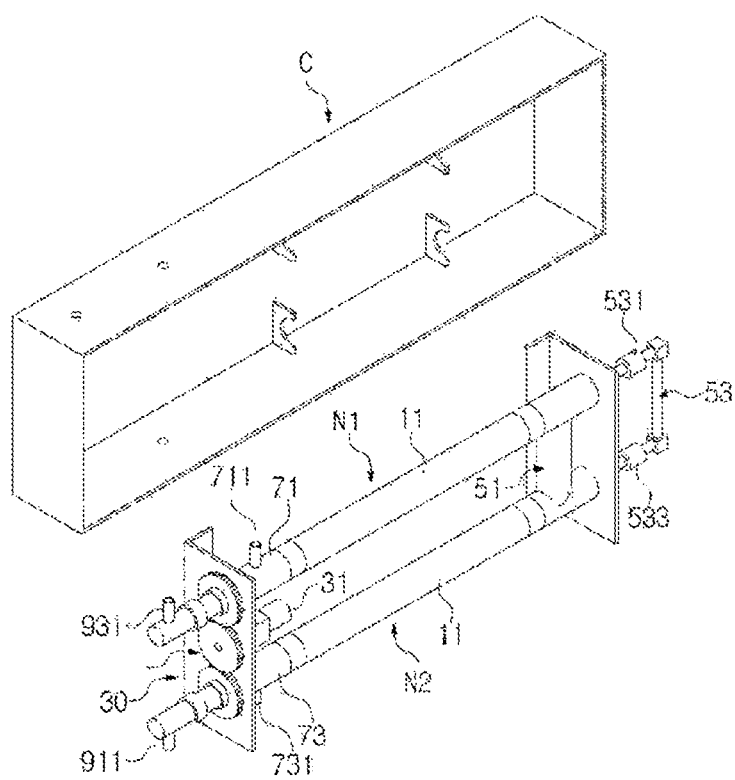
FIG. 1 is a perspective view showing a waste water heat recovery device according to the present invention.
Figure 2:
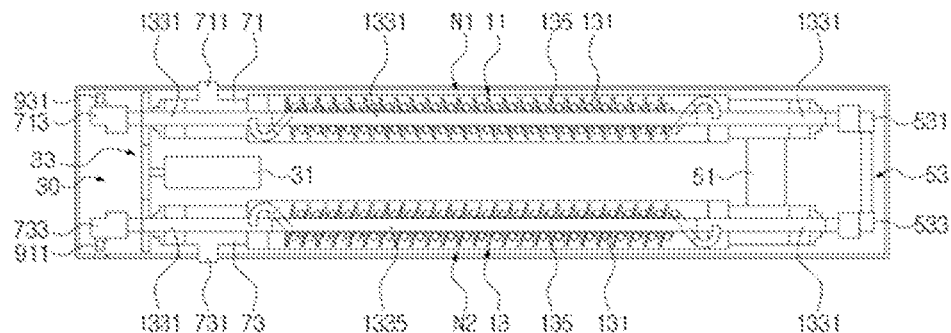
FIG. 2 is a sectional view showing the waste water heat recovery device of FIG. 1.
Figure 3:
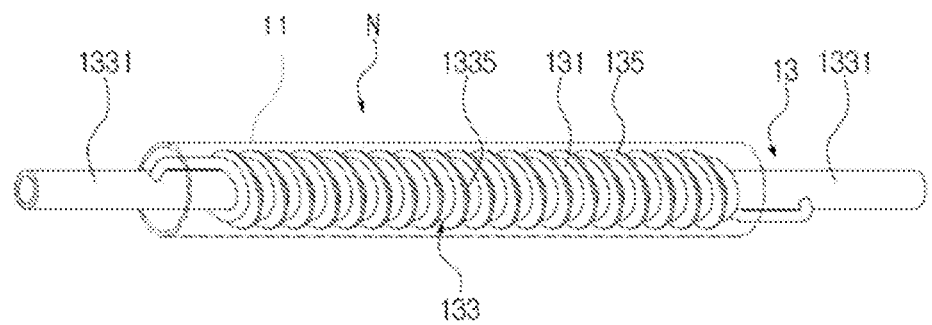
FIG. 3 is a perspective view showing a heat exchange unit adopted in the waste water heat recovery device of FIG. 1.
Figure 4:
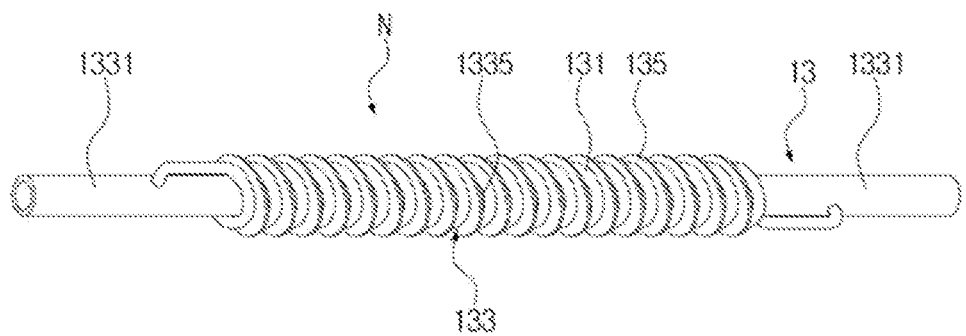
FIG. 4 is a perspective view showing a raw water pipe part of the heat exchange unit of FIG. 3.
Figure 5:
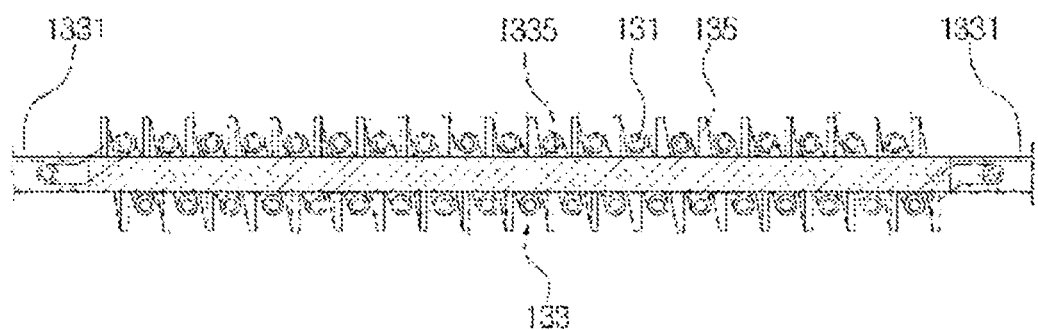
FIG. 5 is a sectional view showing the raw water pipe part of FIG. 4.

FIG. 1 is a perspective view showing a waste water heat recovery device according to the present invention. FIG. 2 is a sectional view showing the waste water heat recovery device of FIG. 1. FIG. 3 is a perspective view showing a heat exchange unit adopted in the waste water heat recovery device of FIG. 1. FIG. 4 is a perspective view showing a raw water pipe part of the heat exchange unit of FIG. 3. FIG. 5 is a sectional view showing the raw water pipe part of FIG. 4. In FIG. 1, after a portion of a case C is open, parts located inside the case C are drawn to the outside, for the conveniences of the description, but in the case of a real product, the parts are located inside the case C having the shape of a closed box. Further, in FIG. 3, a waste water pipe part 11 of a heat exchange unit N is transparently shown so that the interior thereof can be seen.

As shown, the waste water heat recovery device according to a desirable embodiment of the present invention includes the case C in which parts are located. The case C may stand up or lie down on an appropriate installation place.

Desirably, the waste water heat recovery device according to the desirable embodiment of the present invention includes N heat exchange units N1 and N2 each having a waste water pipe part 11 and a raw water pipe part 13, and in this case, N is greater than or equal to 1. According to the desirable embodiment of the present invention, two heat exchange units N1 and N2 are provided, but one or more heat exchange units may be provided for the waste water heat recovery device according to the present invention, without being limited thereto. The heat exchange units N1 and N2 are connected to each other and thus located inside the case C to the form of a bent path, thereby improving space efficiency.

As shown in FIGS. 1 and 2, waste water as hot water is introduced into a waste water inlet 711 formed on the heat exchange unit N1, passes through the heat exchange units N1 and N2, and is then discharged to a waste water outlet 731 formed on the heat exchange unit N2. Contrarily, raw water as cold water is introduced into a raw water inlet 911 formed on the heat exchange unit N2 and then discharged to a raw water outlet 931 formed on the heat exchange unit N1. Like this, the waste water and the raw water pass through the heat exchange units N1 and N2 in different directions from each other, so that heat exchange is performed.

The heat exchange units N1 and N2 each have the cylindrical waste water pipe part 11 and the raw water pipe part 13 inserted into the waste water pipe part 11 in a longitudinal direction of the waste water pipe part 11. The waste water pipe part 11 has the shape of the cylinder and is configured to locate the raw water pipe part 13 thereinside.

As mentioned above, the raw water flows along the raw water pipe part 13 and the waste water along the waste water pipe part 11. For example, the waste water may be hot water discharged after used in a dish washer, and the raw water may be cold water as underground water or tap water to be used in the dish washer.

Desirably, the raw water pipe part 13 of each heat exchange unit includes a spiral raw water pipe 131 located over a given portion or the whole of an area located inside the waste water pipe part 11. As a result, the cold water flows along the spiral raw water pipes 131 to allow the contact area between the waste water and the raw water inside the heat exchange units N1 and N2 to extend, so that the heat exchange efficiency can be improved.

The waste water heat recovery device according to the desirable embodiment of the present invention is configured to suppress the raw water pipe 131 from coming into contact with the inner peripheral wall of the waste water pipe part 11, thereby preventing the abrasion damage of the pipe, especially the raw water pipe 131 from occurring. The raw water pipe 131 has a low thickness so as to sufficiently enhance the heat exchange efficiency, and if the raw water pipe 131 comes into contact with the inner peripheral wall of the waste water pipe part 11, while rotating, in the waste water heat recovery device according to the present invention, the abrasion damage may occur.

To suppress the raw water pipe 131 from being damaged by abrasion, the present invention has the raw water pipe part 13 configured as follows.

The raw water pipe part 13 adopted in the waste water heat recovery device according to the present invention includes a rotary shaft 133 and the spiral raw water pipe 131 wound on the rotary shaft 133. Desirably, the raw water pipe part 13 includes a spiral blade 135 attached to the rotary shaft 133. The spiral blade 135 serves to discharge foreign matter existing inside the waste water pipe part 11, while the rotary shaft 133 is rotating. The raw water pipe 131, which is spirally wound on the outer peripheral surface of the rotary shaft 133, is located along the space formed by the spiral blade 135 on the rotary shaft 133. Further, a diameter of the raw water pipe 131 is desirably smaller than a height of the spiral blade 135 from the outer peripheral surface of the rotary shaft 133, so that in any case, the raw water pipe 131 does not come into contact with the inner peripheral wall of the waste water pipe part 11. That is, the raw water pipe 131 is disposed below top of the spiral blade 135 in a height direction of the spiral blade 135 from the outer peripheral surface of the rotary shaft 133, so that while the raw water pipe 131 is rotating, it has no contact with the inner peripheral wall of the waste water pipe part 11.

Further, the rotary shaft 133 is divided into three portions. For example, the rotary shaft 133 has pipe portions 1331 located on both ends thereof and a rod portion 1335 located between the pipe portions 1331. The pipe portions 1331 and the rod portion 1335 are connected to one another to provide the shape of a generally one straight line type rod.

Both ends of the raw water pipe 131 are connected to the pipe portions 1331, while allowing the raw water to communicate therebetween. Accordingly, the pipe portions 1331 of the rotary shaft 133 serve as the connection portions of the raw water inlet 911, the raw water outlet 941, or raw water pipe connectors. As a result, the heat exchange units N1 and N2 in which the pipes rotate can have a simple configuration.

Desirably, the waste water heat recovery device according to the desirable embodiment of the present invention includes a rotation driving part 30 for rotating the raw water pipe parts 13. Each raw water pipe part 13 having the spiral blade 135 rotates by the rotation driving part 30, so that the foreign matter contained in the waste water within the waste water pipe part 11 may be gently discharged to the outsides of the heat exchange units N1 and N2.

To discharge the foreign matter, the rotation driving part 30 rotates each raw water pipe part 13 in a reverse direction to the spiral direction thereof. In this case, desirably, the flowing direction of waste water is the same as the spiral direction, and as the raw water pipe part 13 rotates, the foreign matter, which may be accumulated in the pipe, is easily discharged together with the waste water flowing. Further, as mentioned above, the waste water may desirably flow in the opposite direction to the flowing direction of the raw water.

The waste water heat recovery device according to the desirable embodiment of the present invention, as shown, includes one or more heat exchange units N1 and N2. If the plurality of heat exchange units N1 and N2 are provided, they are connected in series to each other by means of a first coupling member 51 disposed therebetween. In this case, such series connection of the exchange units N1 and N2 means that the waste water and the raw water continuously flow to the next heat exchange unit, without being changed in a flowing direction thereof. According to the desirable embodiment of the present invention, a straight line type heat exchange unit is actually bent to thus provide the heat exchange units N1 and N2, and under such a configuration, accordingly, the waste water heat recovery device of the present invention is compact in size, while the parts constituting the rotation driving part 30 for rotating the raw water pipe part 13 are being located easily in the device.

According to the embodiment of the present invention, as shown, the heat exchange units N1 and N2 are arranged side by side. The side-by-side arrangement of the heat exchange units N1 and N2 enables the rotation driving part 30 having a motor 31 and a gear set 33 for rotating the respective raw water pipe parts 13 to be simple in configuration. For example, the rotation driving part 30 is located to apply a rotary force to the portion of the raw water pipe part 13 exposed to the outside of one side of the waste water pipe part 11. Further, the side-by-side arrangement of the heat exchange units N1 and N2 enables the device to be compact in size and makes the device appropriately adopted in a kitchen having a generally limited space.

As mentioned above, the waste water and the raw water flow in the opposite directions to each other in the heat exchange units N1 and N2. To have the side-by-side arrangement of the heat exchange units N1 and N2, the waste water heat recovery device according to the desirable embodiment of the present invention includes the first coupling member 51 and a second coupling member 53.

The first coupling member 51 and the second coupling member 53 are disposed between the heat exchange units N1 and N2 and thus connect the heat exchange units N1 and N2 to each other. The first coupling member 51 connects the waste water pipe parts 11 of the neighboring heat exchange units N1 and N2 to each other so that the waste water flows therebetween, and the second coupling member 53 connects the raw water pipe parts 13 to each other so that the raw water flows therebetween.

Further, first and second sockets 71 and 73 are located on the open end portions of the first heat exchange unit N1 and the last heat exchange unit N2 to provide the waste water inlet 711 and the waste water outlet 731 and expose the end portions of the raw water pipe parts 13 to the outside.

The raw water outlet 931 is located on the raw water pipe part 13 exposed to the outside of the first socket 71, and the raw water inlet 911 on the raw water pipe part 13 exposed to the outside of the second socket 71.

The portions of the raw water pipe parts 13 exposed to the outsides of the first and second sockets 71 and 73 do not rotate, and accordingly, the first and second sockets 71 and 73 have one or more rotation couplers 713 and 733 for connecting the non-rotary portions exposed to the outsides thereof and the rotary portions thereof.

The second coupling member 53 connects the raw water pipe parts 13 to each other and has rotation couplers 531 and 533 adapted to rotate the respective raw water pipe parts 13.

The rotation driving part 30 includes the motor 31 and the gear set 33 for transferring the power of the motor 31 to the raw water pipe parts 13 to thus rotate the raw water pipe parts 13.

The gear set 33 includes a drive gear fitted to a shaft of the motor 31 and a driven gear group for receiving the power of the drive gear and thus rotating the raw water pipe parts 13.

As mentioned above, the raw water pipe parts 13 of the neighboring heat exchange units N1 and N2 have the spiral directions opposite to each other, and the gear set 33 rotates the raw water pipe parts 13 in the same direction as each other, so that in the state where the heat exchange units N1 and N2 are arranged side by side, the foreign matter is transferred in the flowing direction of the waste water.

In addition to the gear set 33 as the power transfer element for transferring the power of the motor 31 and thus rotating the raw water pipe parts 13, of course, other equivalent elements, such as a chain, a belt, and the like may be adopted.

The waste water heat recovery device according to the desirable embodiment of the present invention is connected to a dish washer in which a large amount of hot water after use is thrown out as waste water. The hot water discharged from the dish washer is introduced into the waste water inlet 711 of the waste water heat recovery device according to the present invention, passes through the waste water pipe parts 11 of the heat exchange units N1 and N2 sequentially, and is then discharged to the waste water outlet 731. The raw water to be used in the dish washer is introduced into the raw water inlet 911, passes through the raw water pipe parts 13 of the heat exchange units N1 and N2, and is heated when discharged to the raw water outlet 931, so that the heated water is directly supplied to the dish washer (not shown) or transferred to a gas water heater or gas booster and then heated to a target temperature before use.

While the waste water and the raw water are passing through the heat exchange units N1 and N2, the motor 31 of the rotation driving part 30 operates to allow the gear set 33 to transfer the rotary force thereof to the raw water pipe parts 13, so that the raw water pipe parts 13 rotate. That is, the rotary force of the drive gear fitted to the shaft of the motor 31 is transferred to the driven gear group to allow the raw water pipe parts 13 exposed to the outsides of the waste water pipe parts 11 to rotate. As the raw water pipe parts 13 rotate in the reverse directions to the spiral directions thereof, the sewage, foreign matter, and the like contained in the waste water are transferred in the flowing direction of the waste water and thus discharged together with the waste water. In specific, the foreign matter is discharged gently by means of the spiral blades 135 attached to the rotary shafts 133 of the raw water pipe parts 13, and further, the raw water pipes 131 of the raw water pipe parts 13 do not come into contact with the inner peripheral walls of the waste water pipe parts 11 by means of the spiral blades 135. The waste water pipe parts 11 have relatively high pipe thicknesses, and even if they come into contact with the spiral blades 135 of the raw water pipe parts 13, accordingly, it does not matter.

Under the above-mentioned configuration, the waste water as the hot water and the raw water as the cold water are brought into contact with each other for a sufficient period of time, while the foreign matter contained in the waste water is being discharged gently, without being accumulated in the waste water pipe parts 11. Further, the spiral blades 135 attached to the rotary shafts 133 of the raw water pipe parts 13 rotating inside the waste water pipe parts 11 serve to discharge the foreign matter gently, while preventing the raw water pipe parts 13 from coming into contact with the inner peripheral walls of the waste water pipe parts 11, so that even if the raw water pipe parts 13 have relatively low thicknesses or are made of a soft material having high thermal conductivity, such as copper, the raw water pipes 131 are prevented from being damaged by abrasion.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

According to the present invention, the waste water heat recovery device having excellent efficiency is provided. The spiral raw water pipe parts along which the cold water flows are located inside the waste water pipe parts along which the hot water flows, thereby allowing the contact areas for heat exchange to extend. Further, as the raw water pipe parts rotate to effectively discharge the foreign matter existing in the waste water pipe parts, heat of the waste water discharged from the dish washer is recycled. In specific, the spiral blades are attached to the rotary shafts of the raw water pipe parts, and the spiral raw water pipes are located along the spaces formed by the spiral blades, so that the raw water pipe parts are prevented from coming into contact with the inner peripheral walls of the waste water pipe parts, thereby avoiding their abrasions damage. As a result, the raw water pipes can have low thicknesses to the maximum, thereby optimizing the heat exchange efficiency.

EXPLANATIONS OF REFERENCE NUMERALS

11: Waste water pipe part, 13: Raw water pipe part, 30: Rotation driving part, 31: Motor, 33: Gear set, 51: First coupling member, 53: Second coupling member, 71: First socket, 73: Second socket, 131: Raw water pipe, 133: Rotary shaft, 135: Spiral blade, 531, 533: Rotation coupler, 711: Waste water inlet, 713, 733: Rotation coupler, 731: Waste water outlet, 911: Raw water inlet, 931: Raw water outlet, 1331: Pipe portion, 1335: Rod portion, N1, N2: Heat exchange unit, C: Case

The invention claimed is:

1. A device for recovering waste heat from hot water, the device comprising:
    N heat exchange units (wherein N is greater than or equal to 1) connected in series to each other by means of a coupling member, each heat exchange unit having a waste water pipe part along which waste water as the hot water flows and a raw water pipe part along which raw water as cold water flows, while being located inside the waste water pipe part; and
    a rotation driving part for rotating the raw water pipe parts,
    wherein each raw water pipe part comprises a rotary shaft, a spiral blade attached to the outer peripheral surface of the rotary shaft, and a raw water pipe spirally wound on the outer peripheral surface of the rotary shaft to flow the raw water therealong, while being disposed along the space formed by the spiral blade on the outer peripheral surface of the rotary shaft.

2. The device according to claim 1, wherein the raw water pipe is disposed below top of the spiral blade in a height direction of the spiral blade from the outer peripheral surface of the rotary shaft, so that while rotating, the raw water pipe has no contact with the inner peripheral wall of the waste water pipe part.

3. The device according to claim 1, wherein the rotary shaft comprises pipe portions located on both ends thereof and a closed rod portion located between the pipe portions.

4. The device according to claim 3, wherein both ends of the raw water pipe are connected to the pipe portions of the rotary shaft, while allowing the raw water to communicate therebetween.

* * * * *